(No Model.)
W. T. O'BRIEN.
COLLAR PAD.
No. 439,678. Patented Nov. 4, 1890.
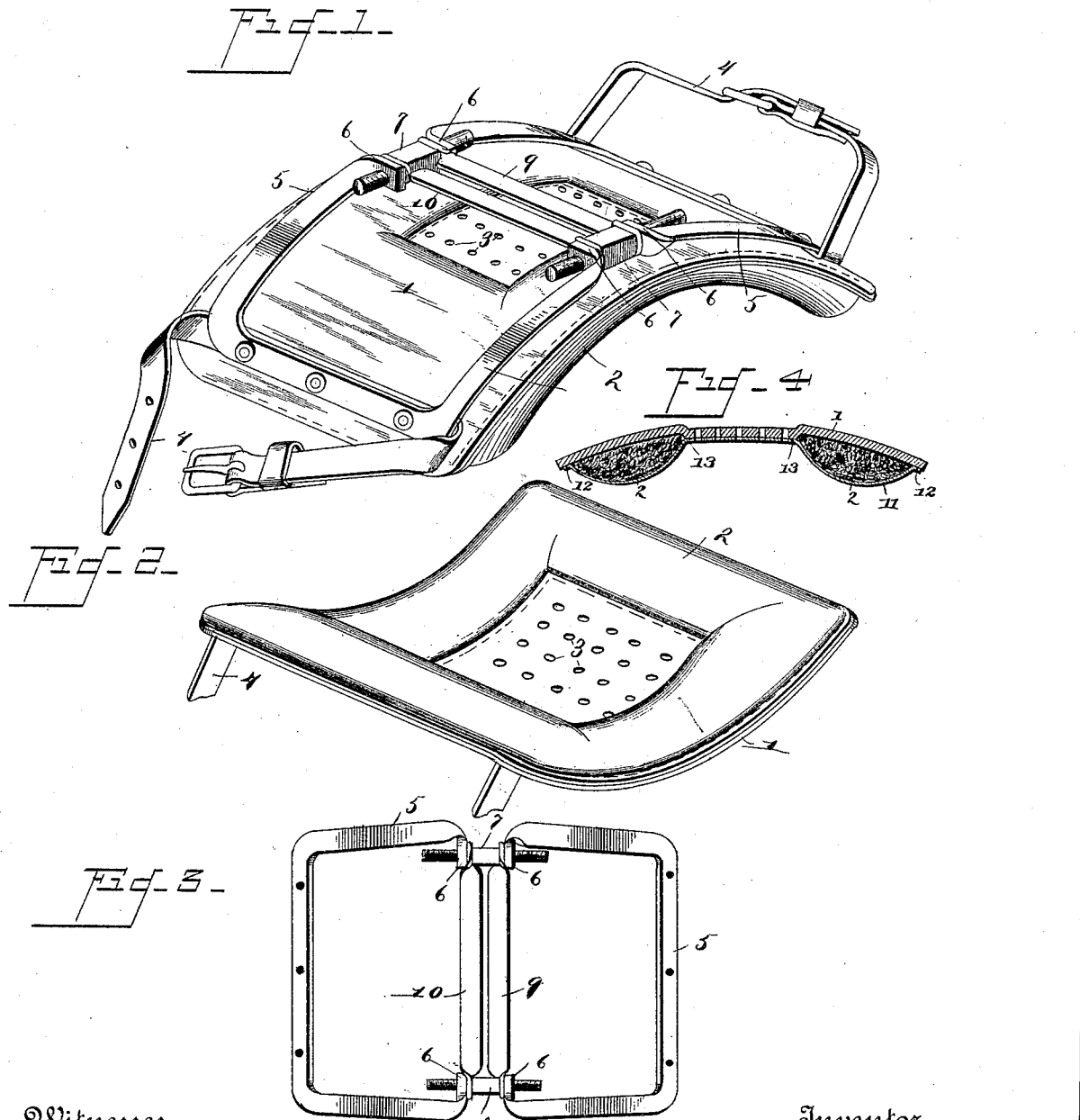

UNITED STATES PATENT OFFICE.

WILLIAM T. O'BRIEN, OF ROLLING PRAIRIE, INDIANA.

COLLAR-PAD.

SPECIFICATION forming part of Letters Patent No. 439,678, dated November 4, 1890.

Application filed December 7, 1889. Serial No. 332,888. (No model.)

*To all whom it may concern:*

Be it known that I, WILLIAM T. O'BRIEN, a citizen of the United States, residing at Rolling Prairie, in the county of La Porte and State of Indiana, have invented a new and useful Collar-Pad, of which the following is a specification.

The invention relates to improvements in collar-pads.

The object of the present invention is to provide a collar-pad of simple and inexpensive construction adapted to be adjusted to fit the neck of a horse and capable of permitting ventilation and of bearing equally upon all points in which it is in contact with the animal.

The invention consists in the construction and novel combination and arrangement of parts, hereinafter fully described, illustrated in the accompanying drawings, and pointed out in the claims hereto appended.

In the drawings, Figure 1 is a perspective view of a collar-pad constructed in accordance with the invention, illustrating the frame for adjusting the pad to the neck of a horse. Fig. 2 is a similar view, showing the padded portion and the central perforation. Fig. 3 is a detail plan view of the frame for adjusting the pad. Fig. 4 is a sectional view of the pad.

Referring to the accompanying drawings, 1 designates the back of a pad, constructed of a single thick piece of leather or similar material and provided around the edges of its lower face with a cushioned or padded portion 2, which when the pad is in place lies in contact with the neck of the animal. The central portion of the pad, which is arranged within the cushioned portion 2 and lies above the face of the latter, is provided with a series of perforations 3, which permit the circulation of air to the neck of the horse and prevent soreness.

The pad is secured to a collar in the ordinary manner by straps 4, and is adjusted to the neck of the animal by a frame that is composed of two similar U-shaped pieces 5, which have their ends 6 extending laterally within the opening partially inclosed by them. The ends 6 are threaded and engaged by adjusting-screws 7, that have a central squared portion and are provided upon one side of the squared portion with a right-hand thread and upon the other side with a left-hand thread, whereby when the adjusting-screws 7 are turned by a wrench the U-shaped pieces, which are secured at the ends of the pad, will be either drawn together and the pad flattened or forced apart and the pad curved. By this construction the pad can either be flattened or curved, as desired, and adjusted to fit the neck of any animal. The U-shaped pieces of the adjusting-frame are braced and prevented from spreading laterally by similar cross-pieces 9 and 10, which lie flat and have their ends twisted at right angles and perforated and fitted upon the adjusting-screws and arranged between the squared portions and the laterally-extending ends of the U-shaped pieces. It will thus be seen that the collar-pad is simple and inexpensive in construction, adapted to permit the circulation of air and prevent soreness, and capable of being adjusted to fit the neck of any animal.

The back 1 of the pad has the pad-covering 11 secured to it by an outer row of stitches 12 and an inner row 13, and the portion between the rows of stitches is padded, which padded portion entirely surrounds the central perforations and raises the latter above the lower face of the pad.

Having thus described my invention, what I claim is—

1. The combination of the pad and the adjusting-frame composed of the two portions 5, secured to opposite ends of the pads and having their adjacent ends threaded and connected by the adjusting-screws, whereby the pad may be fitted to the neck of an animal, substantially as described.

2. The combination of the pad and the adjusting-frame comprising the U-shaped pieces 5, secured to the ends of the pad and having their adjacent ends threaded, the adjusting-screws connecting the threaded ends, and the cross-pieces, substantially as and for the purpose described.

3. The combination of the pad, the adjusting-frame secured to the ends of the pad and comprising the U-shaped pieces 5, having their adjacent ends bent laterally and threaded, the adjusting-screws having the central squared portion and engaging the ends of the U-shaped pieces, and the perforated crosspieces arranged upon the screws and adapted to prevent the spreading of the U-shaped pieces of the frame, substantially as and for the purpose described.

In testimony that I claim the foregoing as my own I have hereto affixed my signature in presence of two witnesses.

WILLIAM T. O'BRIEN.

Witnesses:
WILLIAM STUETZ,
JULIUS E. LORM.